United States Patent [19]
Darden

[11] 4,085,515
[45] Apr. 25, 1978

[54] ALIGNMENT DEVICE
[76] Inventor: Donald R. Darden, 519 Corday St., Lot 3, Pensacola, Fla. 32503
[21] Appl. No.: 759,880
[22] Filed: Jan. 17, 1977
[51] Int. Cl.² .................................................. G01C 9/22
[52] U.S. Cl. ................................... 33/377; 33/185 R; 33/390; 33/370; 33/344; 408/16
[58] Field of Search ................... 408/115, 16, 241, 75; 33/88, 185 R, 381, 382, 389, 333, 334, 377, 390, 370, 344

[56] References Cited
U.S. PATENT DOCUMENTS

| 1,409,537 | 3/1922 | Franzen | 33/377 X |
| 3,763,570 | 10/1973 | Andersen | 33/185 R |

FOREIGN PATENT DOCUMENTS

| 550,278 | 5/1932 | Germany | 33/377 |
| 117,948 | 8/1918 | United Kingdom | 33/377 |

Primary Examiner—Leonidas Vlachos
Attorney, Agent, or Firm—John E. Benoit

[57] ABSTRACT

An alignment device comprising a plurality of hollow arcuate sections secured together at their inner edges so as to form a hollow center with a base support member, an aperture for admitting fluid and scalar indicia about the outer edges of the arcuate section. The device may be adapted to removably accept a rigid rod opposite said base, said rod being adapted for insertion into the chuck of a drill.

5 Claims, 7 Drawing Figures

ALIGNMENT DEVICE

This invention relates generally to alignment devices and more particularly to fluid level alignment devices for use with drill presses and hand held drills which may be mounted in drill presses.

BACKGROUND OF THE INVENTION

Hand drills are commonly used in drill presses which are adapted to hold the hand drill in a fixed position and allow adjustment vertically or at an angle with respect to the drill press table on which the work piece is mounted. In order to use such a combination, it is necessary to align the hand drill properly with the work piece on the table. The normal procedure is to level the table attachment whenever possible, and subsequently to adjust the hand drill to the desired position after it is mounted on the drill press. There have been many devices used in an attempt to obtain such alignment. However, most of these devices relate to means for aligning the hand drill and leveling it with respect to the case of the drill. Such alignment presumes that the case will have specific flat surfaces which may be used for this purpose. Many of these cases are designed in order to have a pleasant appearance and to avoid sharp corners so that there is no such flat surface. With this type of drill it is almost impossible to obtain a proper alignment using available alignment techniques.

A further method for attempting to align the hand drill with the work table has been to use bubble levels of various types. These levels may be fairly accurate in aligning the table itself, but the same difficulties as discussed above are inherent in attempting to align or level the hand drill itself.

There have been proposals to use an alignment tool which fits directly into the chuck of the hand drill. Such a device is shown in U.S. Pat. No. 3,838,935 issued to Alfred Boyagaian. However, such a device is limited to certain usages and specifically to reading only right angles. Further it requires that the drill be positioned so that the alignment tool can be brought into direct contact with either the work table of the drill press or drill stand. Other factors limit the use of such a device.

Accordingly, it is an object of the present invention to provide an alignment device which relies on the use of a liquid within the device to indicate the angle at which the device is set. It further may be used by placing it directly upon the work table using the same liquid indication within the instrument to indicate the position of the table and for leveling the same.

SUMMARY OF THE INVENTION

The present invention provides an alignment device having a plurality of hollow transparent arcuate sections, with the sections being secured together at their inner edges so as to form a common hollow central section. The base is secured to and supports the arcuate sections and an aperture is provided in the device for admission of a liquid. Scaler indicia are ruled about the edges of the arcuate sections so that liquid level may be indicated thereon. Means may also be provided so as to limit the liquid flow within the instrument due to any tilting or vibrations in order to eliminate any wave action which might tend to give an improper reading on the indicia scale.

BRIEF DESCRIPTION OF THE DRAWINGS

A preferred embodiments are shown in the accompanying drawings wherein.

DESCRIPTION OF A PREFERRED EMBODIMENTS OF THE INVENTION

Figure 1:
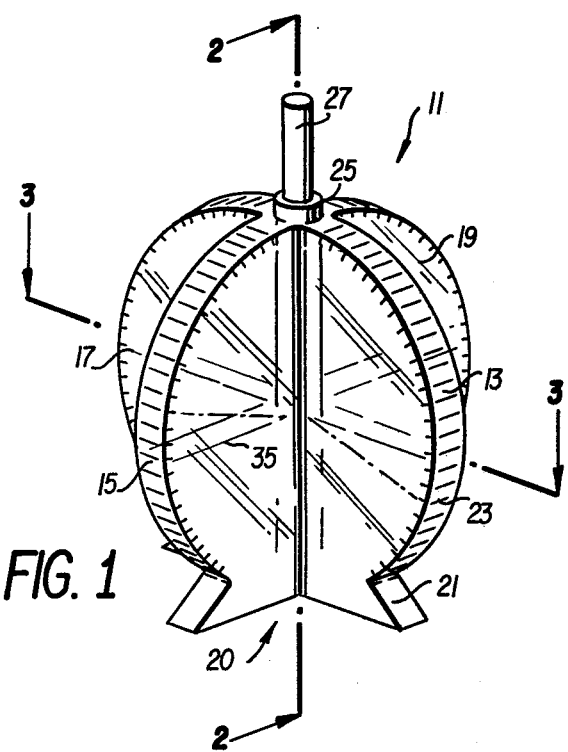
FIG. 1 is a perspective view of the instrument of the present invention.

Turning now more specifically to the drawings, there is shown in FIG. 1 a level instrument used for alignment having a plurality of hollow transparent arcuate sections 13, 15, 17 and 19. A base 20 is secured to and supports the arcuate sections. In the embodiment shown the base comprises a plurality of legs 21. As illustrated herein the device is shown to be of an integral construction, although it could obviously be composed of separate parts joined together by any well known means such as adhesive or the like. Each of the arcuate sections has been ruled with indicia extending about the outer edges thereof. The indicia on each of the arcuate sections are identical and may include identifying means, such as numbers (not shown), for alignment purposes.

Figure 2:
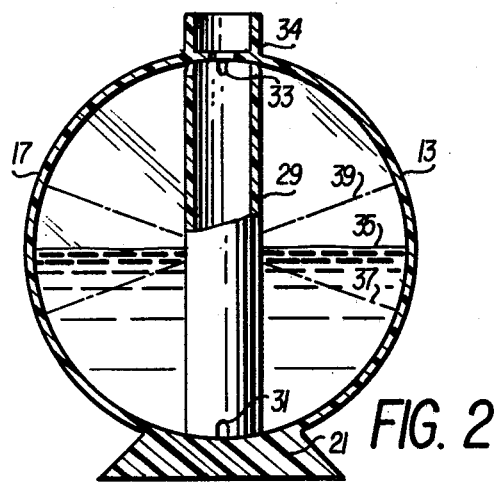
FIG. 2 is a sectional view taken along the lines 2—2 of FIG. 1.
Figure 3:
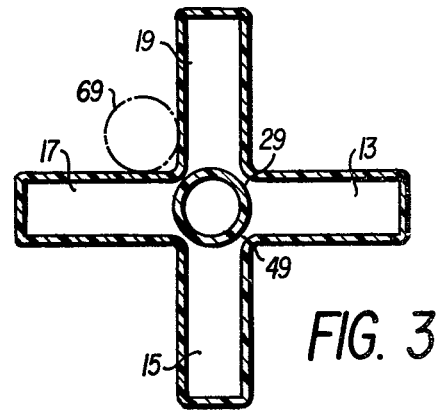
FIG. 3 is a sectional view taken along the lines 3—3 of FIG. 1.

As can be seen more clearly in FIGS. 2 and 3, the particular embodiment of the invention illustrated in FIG. 1 is constructed so that the arcuate sections terminate at their inward sides so as to form a hollow central section. A hollow conduit 29 extends upwardly from the base 21 and is centrally located so as to be substantially evenly spaced within the central section provided by the arcuate sections. The conduit 29 is provided with fluid passages 31 and 33 at either end thereof. This permits passage of fluid at one end of the conduit and permits air movement at the other end.

An access port 34 is provided at the opposite end from the base 21 so that liquid may be supplied to the conduit and, thus, to the interior of all of the arcuate arms.

A hollow tubular extension 25 extends outwardly from the instrument opposite base section 21. This tubular section accepts a chuck stud 27 which is merely a cylindrical device, preferably of metal or other hard material, which is frictionally held within the extension 25 and which is of a size to fit within the chuck of a standard drill for purposes which will become apparent as the description proceeds.

FIGS. 1 and 2 illustrate a water line 35 when the device is in a substantially level position. The dotted lines 39 illustrate various water lines which occur as the device is adjusted at different angles.

Figure 4:
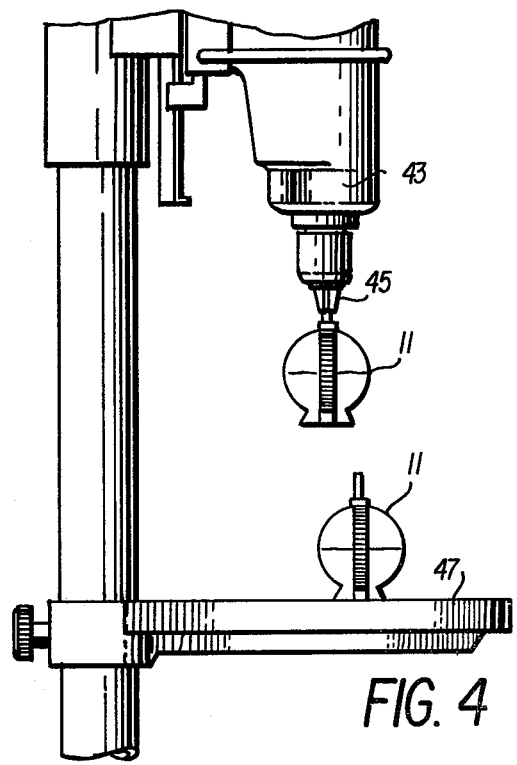
FIG. 4 is an illustration of the use of the alignment device of the present invention with a drill press and a hand drill.

FIG. 4 illustrates the use of the alignment device 11 in conjunction with a drill stand 41 having an adjustable drill stand table 47. The instrument 11 is placed so that the chuck stud 27 is within the chuck 45 of the hand drill 43 which is shown mounted in place. In the normal drill stand which is provided for this type of work, the mounting means for holding the hand drill 43 is adjustable in all directions. This particular stand and such adjustments are not considered part of this invention and, therefore, details of such adjustment are not included herein. There is also illustrated a further leveling instrument identical to instrument 11 which rests upon the drill stand table 47 in order that the table may be leveled before any adjustment of the drill is made. It is quite obvious that two of the devices are not needed since the table may be leveled first and then the instrument may be placed in the chuck of the hand drill.

In order to eliminate or substantially reduce any wave motion in the water existing in the various arcuate sections, it is desirable to effectively limit the area through which the water passes between the various sections. In the embodiment shown in FIGS. 1 through 3, the hollow central conduit 29 is of a dimension such that it provides narrow fluid passageways between the arcuate sections. This arrangment permits the total length from one wing to another to be used in readings while restricting wave motions to each individual arcuate section. The result is a level which provides an accurate reading in which the fluid motion settles very rapidly.

Preferably, the four arcuate sections are fixed at an angle of 90° to each other. This provides all necessary readings and reduces the amount of fluid required to a minimum. It also effectively restricts fluid movement to two primary axes. By aligning these axes to the axis of the adjustment for the device, it is possible to visibly note the effects of the adjustments as they are being made. The rotating axis of the chuck of the drill press or of the hand drill mounted in the drill stand is the primary axis of consideration when alignment takes place. By clamping the device of the present invention in the chuck by means of the chuck stud, the instrument is automatically placed exactly along the rotating axis of the drill.

It should be noted that the body of the instrument can be filled until only a small bubble is visible, or the level may be lowered until only a small quantity of liquid is being used for level indications. The level shown in FIGS. 1 through 3 of the drawings illustrates the instrument as filled halfway with fluid. This is the ideal level, since readings on either arcuate section involved can be used to confirm readings in the opposed sections, and the high liquid level further insures that there is a free exchange of fluid between the various sections regardless of positions assumed by the instrument. The ability to read across both arcuate sections makes it possible to insure that the level of the liquid does not distort the readings which are obtained. As an example, if a 45° angle of inclinations is being sought, but different readings are obtained on opposite sides, with one side reading 43° and the other side reading 47°, then it is obvious that a low liquid level has resulted in a 2° error on either side and that the correct reading is the average of the two readings, or 45°.

Figure 5:
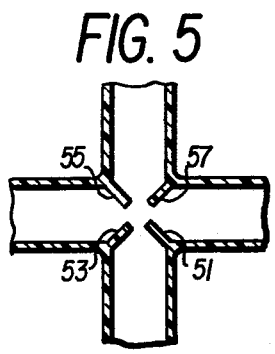
FIGS. 5, 6 and 7 illustrate further embodiments of the device of the present invention.
Figure 6:
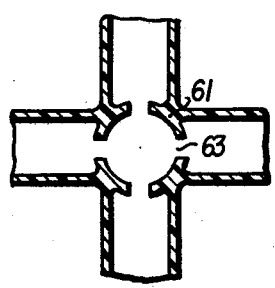
Figure 7:
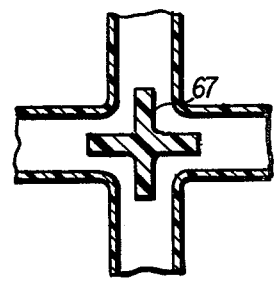

Other means may be used in order to limit the liquid movement between the arcuate sections. Such other embodiments are shown in FIGS. 5, 6 and 7. In FIG. 5, integral baffles 51, 53, 55 and 57 extend inwardly from the intersection lines of the arcuate sections. These baffles preferably extend the length of the sections.

In FIG. 6, baffles are also used, but terminate in curved sections 61 so as to provide only small passageways 63 entering into each of the arcuate sections.

FIG. 7 shows the use of a single element extending upwardly from the bottom or base section and consists of four baffles 67 which extend inwardly into each of the arcuate sections so as to provide a tortuous path for the liquid as it is passing between the arcuate sections.

With the instrument constructed so that the arcuate sections are at 90° angles with each other, it may also be used to level a drill through the use of a circular rod being placed within the drill chuck. FIG. 3 shows, in dotted lines, a circular rod 69 which, by being placed tangentially against two of the arcuate faces, provides a proper alignment reading when used with the instrument. This provision could also be used to check the alignment with the standard drill bit after the instrument has previously been aligned as discussed above.

As will now be apparent, the present invention offers a significant improvement over previous levels that might be used for this type of application. In addition to the obvious advantages discussed above, it should be noted that the transparent body of the level makes it possible to take readings under various light conditions. Also, with the broad level base involved, the device is more accurate when leveling tables. As pointed out above, the opposed arcuate sections will read two axes simultaneously since matching scales are used in each arcuate section and, therefore, provide indications at either end of the level liquid suface in the axis of consideration. Obviously, the device could be used in a regular drill press as well as for the hand drill as illustrated herein.

The above description and accompanying drawings are illustrative only since specific configurations could be modified without departing from the invention. Accordingly, the scope of the invention is to be limited only by the following claims.

I claim:

1. An alignment device comprising
   a plurality of hollow transparent arcuate sections, each of said sections comprising;
      substantially parallel side walls joined at their perimeters by an arcuate outer wall; said sections being secured together at the inner edges of adjacent side walls so as to form a common hollow central section;
   a base secured to and supporting said arcuate sections;
   an aperture in said instrument for admission of a liquid;
   scalar indicia about the outer edges of each of said arcuate sections;
   means in said device for removably retaining a rigid rod, said rod being adapted for insertion into the chuck of a drill; and
   means within said hollow central section for restricting fluid flow between said arcuate sections.

2. The alignment device of claim 1 wherein said means for restricting fluid flow comprises
   a hollow conduit extending from said base within said hollow central section; and
   a plurality of fluid passageways in the wall of said hollow conduit.

3. The alignment device of claim 1 wherein said means for restricting fluid flow comprises
   a plurality of baffles extending from said arcuate sections into said central section.

4. The alignment device of claim 3 wherein said baffles terminate in curved plates.

5. The alignment device of claim 1 wherein said means for restricting fluid flow comprises
   a plurality of baffles extending from said base within said hollow cylindrical section.

* * * * *